Dec. 31, 1940.  G. G. SPEER, JR  2,226,878
TRANSMISSION MECHANISM
Filed Dec. 8, 1939  2 Sheets-Sheet 2
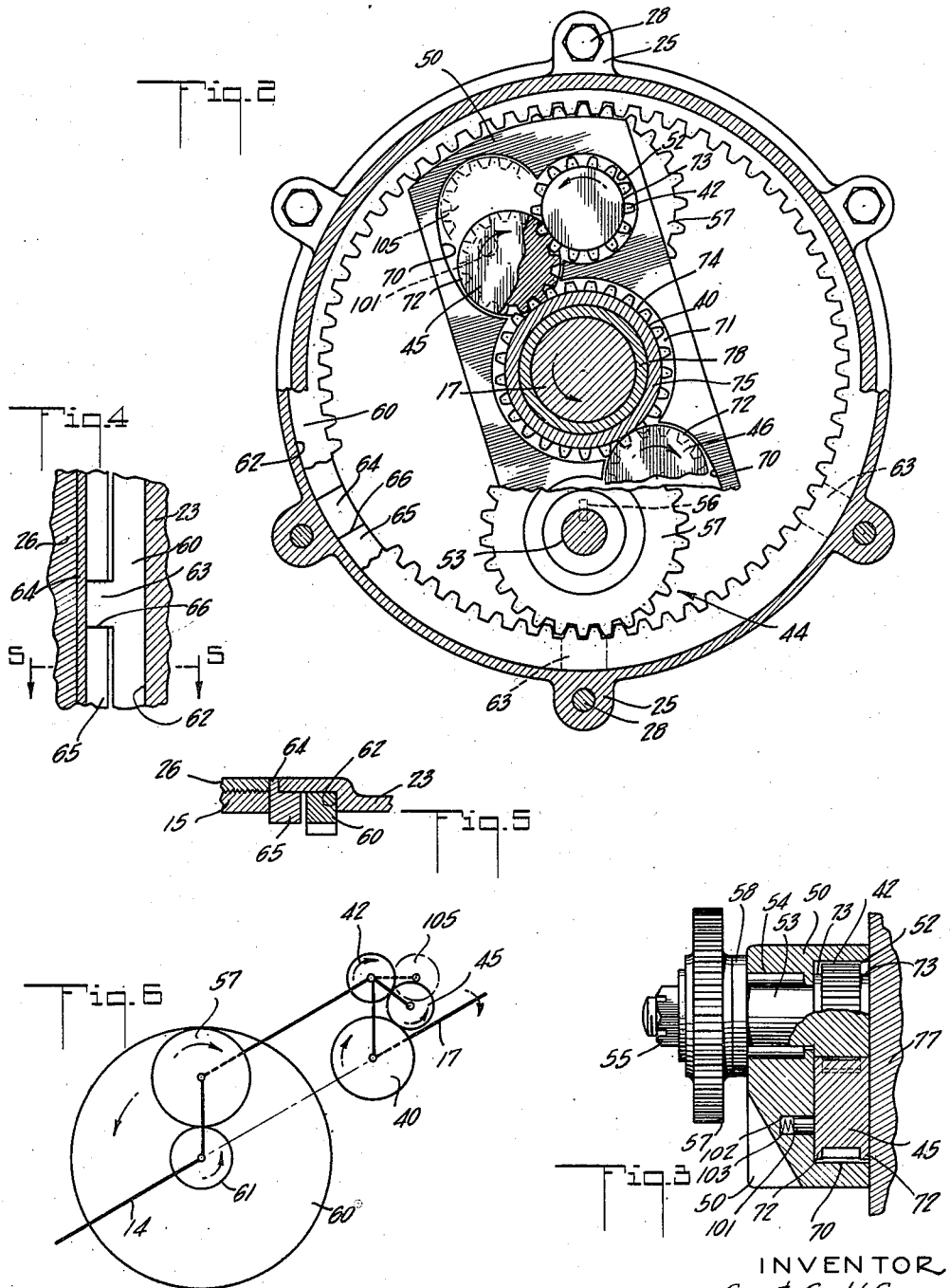
INVENTOR
Grant Gould Speer Jr.
BY John Flam
ATTORNEY Patented Dec. 31, 1940

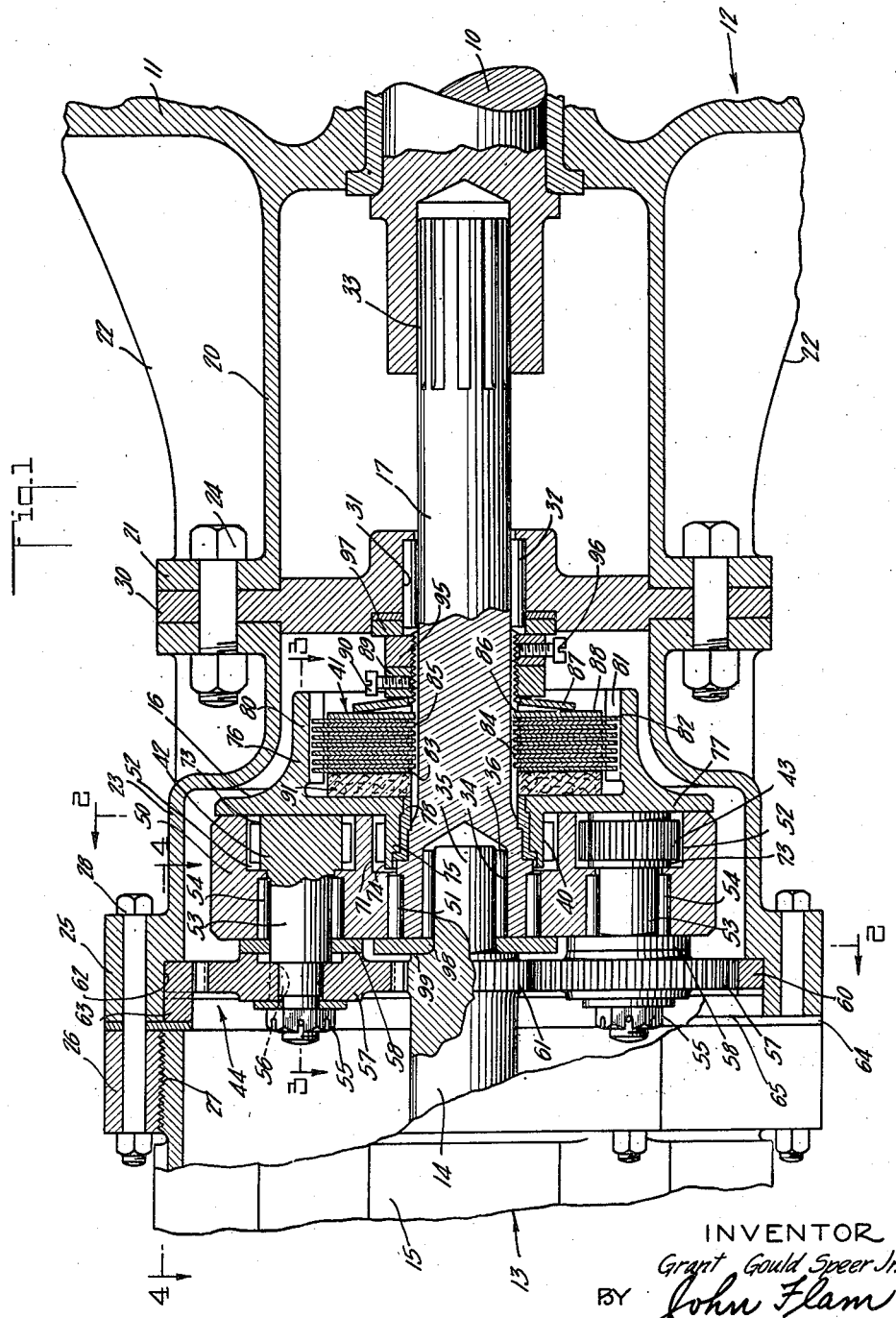

2,226,878

UNITED STATES PATENT OFFICE 2,226,878

TRANSMISSION MECHANISM

Grant Gould Speer, Jr., Los Angeles, Calif., assignor to Electrical Development Co. Inc., Los Angeles, Calif., a corporation of California Application December 8, 1939, Serial No. 308,214

8 Claims. (Cl. 74—8)

This invention relates to transmission mechanism and particularly to one useful for connecting a starting motor to an internal combustion engine, such as an automotive equipment.

Starter mechanisms are in general well known, and usually include a pinion arranged to be driven by the starting motor, which pinion is caused to engage a gear fixed on the engine crank-shaft, either directly or by means of an idler, upon energization of the starting motor. Thus rotation of the starting motor imparts rotation to the engine shaft. Upon the engine beginning to operate under its own power, the engine shaft rotates more rapidly than it does under the influence of the starter. To prevent such rotation causing the starter mechanism to rotate at a high and dangerous speed, the gearing is arranged so as to be immediately disconnected upon starting of the engine.

It is a principal object of this invention to provide such a mechanism, having an improved means for controlling the connection of the starting motor to the engine.

It is another object of this invention to provide such a mechanism in which the rotation of the starting motor is effective to urge the gears into driving relation without the use of springs or other mechanical connections.

It is another object of this invention to provide such a mechanism wherein the gears are immediately disengaged upon the engine's starting.

It is still another object of this invention to provide a transmission mechanism providing a large gear reduction without requiring a gear member of large diameter or an excessive number of gears. Thus the transmission is particularly useful for connecting a starter motor to an airplane engine of the type in which the propeller takes the place of the flywheel.

It is a still further object of this invention to provide such a mechanism which is symmetrical about its axis and which is capable of being mounted coaxially with respect to the engine shaft.

It is a still further object of this invention to provide such a transmission having means to prevent damage to the gearing or starting motor in case the engine back fires.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

In the drawings:

Figure 1 is a longitudinal section through the transmission, as installed in connection with an internal combustion engine;

Figs. 2, 3 and 4 are detail sections as seen on the correspondingly numbered planes of Fig. 1;

Fig. 5 is a detail section as seen on plane 5—5 of Fig. 4; and

Fig. 6 is a diagrammatic showing of the transmission gearing.

Referring to the drawings and particularly to Figs. 2 and 6, the driven gear 40 is shown as connected to the crank shaft 10 of an engine, and adapted to be driven by a starting motor for operating the shaft 10.

The train of gearing for driving gear 40 may be now generally set forth. A driving pinion 42 is arranged to be driven by a source of power, as for example, the starting motor; the manner in which this drive is accomplished will be set forth hereinafter. An idler or floating pinion 45 is rotatably supported for arcuate movement about the axis of pinion 42 and is maintained constantly in mesh with pinion 42. The idler 45 is arranged to move into and out of engagement with the spur gear 40, depending on the relative speeds of pinion 42 and gear 40. Thus, if pinion 42 is driven in the direction indicated by the various arrows (counterclockwise in Fig. 2) it will rotate idler 45 in a clockwise direction (Fig. 2) and also cause it to roll downwardly into engagement with gear 40 about the axis of pinion 42. The idler 45 now operatively connects pinion 42 and gear 40, and rotation of the pinion 42 will be imparted to the gear 40 and connected parts. If gear 40 tends to rotate at a more rapid rate than that imparted by pinion 42, wheel 45 will be rolled around the periphery of pinion 42, so that the wheel 45 will describe a planetary path about the axis of pinion 42, and in a clockwise direction as viewed in Fig. 2. Thus the driving connection between pinion 42 and gear 40 will be interrupted.

Thus gear 40 may be arranged to drive the crank shaft 10 of an internal combustion engine, as in the present case, and pinion 42 may be arranged to be driven by a suitable source of power such as an electric motor, to impart rotation to the crank shaft until the engine operates under its own power. If now the starting motor is energized, the rotation of pinion 42 causes idler 45 to roll in a planetary manner, into mesh with gear 40, whereby the source of power rotates the crank shaft. When the engine starts, the crank shaft 10, and consequently gear 40 turn much faster than when driven by the source of power. This immediately throws idler 45 out of engagement with gear 40 which prevents the pinion 42 and starting motor from being driven by rotation of the crank shaft.

Referring to Fig. 1 of the drawings, the crank shaft 10 of an internal combustion engine is shown as extending through an end wall 11 of the crank case 12. Crank case 12 is shown as provided with a cylindrical extension 20 terminating in a flange 21. A plate or web 30 is suitably secured to flange 21. An extension shaft 17 is joined to crank shaft 10 as by a spline connection 33 and extends through extension 20 and opening 31 in web 30, a suitable anti-friction bearing 32 serving to support the shaft extension 17 in web 30. The other end of shaft 17 carries the driven gear 40. Driven gear 40 may be directly connected to shaft 17, or an overload connection, as clutch 41, may be interposed between them, to be more fully disclosed later. Pinion 42 is suitably supported with respect to gear 40 by a yoke member 50. Yoke member 50 also provides a guide for idler 45, as will be hereinafter described.

Pinion 42 could be driven directly by the starting motor, but to obtain sufficient speed reduction between the motor and the crank shaft 10 in such an arrangement, the gear 40 would have to be of relatively large diameter. In order to make it possible to use a gear 40 of small diameter, the motor is arranged to drive pinion 42 by means of epicyclic reduction gearing 44. By this means, pinion 42 is not only rotated about its axis, but is given a planetary movement around gear 40 as well. This results in a relatively large speed reduction with few gears of small diameter. This arrangement has the further advantage of permitting the starting motor and transmission to be mounted coaxially with crank shaft 10, resulting in a compact and symmetrical design.

To permit such planetary motion of pinion 42, the yoke member 50 is rotatably supported on shaft 17 adjacent one end thereof by means of a roller bearing 51. In order to provide a balanced construction, yoke 50 is extended beyond shaft 17 so as to support a second driving pinion 43 which is diametrically opposite pinion 42, and is symmetrical with pinion 42 about the axis of shaft 17. Pinion 43 is arranged to be operatively connected to gear 40 by an idler gear 46 (Fig. 2). The gears 43, 46, are duplicates in structure and action of gears 42, 45; it would be possible obviously to provide more than two sets of these gears should it be desirable.

Since driving pinions 42, 43 and idlers 45, 46 are duplicates, only one pair need be described. Thus referring to Figs. 1, 2 and 3, pinion 42 is shown as accommodated in a circular recess 52 formed in yoke 50, suitable clearance being provided about the gear teeth. Pinion 42 is formed integrally with a stub shaft 53, which is suitably supported in yoke 50 as by an anti-friction bearing 54, such as needle or roller bearings. Secured to the end of shaft 53 by a nut 55 and a key 56 is a planet gear 57. This planet gear is given a planetary motion about the axis of shaft 17, by the aid of gear wheels that will later be described. Such planetary motion is thus likewise imparted to pinion 42, which is joined to the shaft 53 of the planet gear 57. The yoke 50 is of course likewise rotated about the axis of shaft 17, due to the planetary motion of gear 57. A suitable thrust washer 58 may be provided between gear 57 and the surface of yoke 50.

The starting motor 13 is provided with the armature shaft 14. The motor 13 may be of any suitable type; such motors are well known, and since the details thereof are not pertinent to the invention, the motor 13 will not be described further than to point out that the left hand end of shaft 14 (Fig. 1) is suitably supported by a bearing (not shown) in the shell 15 of motor 13.

Shaft 14 is coaxial with crank shaft 10 and shaft 17, and may be operatively connected therewith, through the gears 42, 45, and 43, 46, and planet gears 57. These gears form a transmission mechanism generally indicated by 16.

A support must be provided for the motor 13; preferably such support may be formed directly on crank case 12. Thus a housing 23 which serves to enclose transmission 16 is secured to flange 21 as by bolts 24, and has a flange 25 to which motor shell 15 is secured. For this purpose, an adapter ring 26 is provided on shell 15, being threadedly attached to the shell as indicated at 27. Bolts 28 serve to secure the ring 26 and motor shell 15 to flange 25.

The left hand end of extension shaft 17 has a recess or bore 34 in which the end portion 35 of armature shaft 14 is rotatably supported. An anti-friction bearing 36 which may be of the needle or roller type is disposed in bore 34. Thus the armature shaft 14 is supported by the extension 17 and is freely rotatable relative thereto.

Planet gears 57 mesh with a stationary ring gear 60, secured in housing 23 against rotation in a manner to be presently described. As a means of driving gears 57, armature shaft 14 is provided with a pinion 61 which engages the gears 57. Rotation of gear 61 will cause gears 57 and connected parts to rotate respectively about their own axes, as well as about the axis of shaft 14, in a well understood manner, the relative rates of rotation depending on the sizes of gears 57 and 61.

The internal gear 60 is formed as a ring provided with gear teeth on its inner periphery, and is accommodated in a counterbore 62 formed in housing 23. Ring gear 60 has a plurality of longitudinally extending lugs or bosses 63 (Figs. 1, 2 and 4).

Clamped between flanges 25 and 26 is a plate 64, provided with holes to accommodate bolts 28 and formed of L-section with a heavy inner flange 65 (Fig. 5). This flange is provided with slots 66 to accommodate lugs 63. As clearly shown in Figs. 1 and 4, with the parts in assembled relationship, lug 63 is of such length as to contact the bottom of recess 66, whereby plate 64 is effective to hold ring gear 60 on the bottom of counterbore 62. At the same time the sides of lug 63 engage the sides of recess 66 of ring 64, thereby preventing rotation of ring gear 60, ring 64 being held against movement by bolts 28.

An arcuate recess 70 to accommodate the floating pinion or idler 45 is formed in yoke 50 and intersects recess 52 as well as a central recess 71 which accommodates gear 40. Since the outside wall of recess 70 is relied on to maintain idler 45 in mesh with pinion 42, this wall is formed as a cylindrical surface curved about the axis of gear 42 as a center, and so spaced therefrom that when the exterior of idler 45 is in contact with the wall of recess 70, the idler teeth engage those of pinion 42. To prevent the tops of the teeth on the idler 45 wearing the wall of recess 70 unduly, these teeth are provided with a full shroud 72, as plainly shown in Fig. 3. The outside diameter of this shroud is at least equal to, or preferably slightly greater than the diameter over the teeth. Thus the idler has a cylindrical surface to contact the wall of the recess 70.

Shrouds 72 are also useful to prevent the idler teeth from "bottoming" on the pinion 42 or gear 40. By "bottoming" is meant that the tops of the teeth on one gear contact the bottoms of the spaces between the teeth on the other. Such misalinement causes rapid wear. By providing cylindrical surfaces 73 of the proper diameter on pinion 42 to engage shrouds 72 on idler 45, the pinion and idler are prevented from approaching each other too closely. Cylindrical shoulders 74 (Fig. 1) formed on the opposite sides of the teeth on gear 40, similarly cooperate with shrouds 72 to prevent idler 45 approaching gear 40 too closely.

From the described construction, it will be plain that rotation of the motor shaft 14 will cause rotation of gear 40, the relative speeds and directions of rotation depending on the number of teeth in the various gears. Further, the increased speed of rotation of yoke 50 caused by the starting of the engine will create increased centrifugal force acting on idlers 45, 46, and ensuring that they move out of engagement with driven gear 40, to the outer extremities of their respective recesses 70.

Gear 40 might be arranged to drive the crankshaft 10 directly, as by being secured to shaft 17. However, such an arrangement is not desirable, since in case the engine back fires and crank shaft 10 is thereby driven in the reverse direction, serious damage to the gearing is likely to result. This is because the armature and armature shaft, rotating at a relatively high speed, have considerable inertia, and the force exerted by the crank shaft 10 turning backwards is opposed to this inertia through the connecting gearing, which under these conditions becomes multiplying gearing. Thus, a relatively small amount of inertia acting on shaft 14 imposes a severe load on the gearing upon a reversal in the direction of rotation as well as direction of transfer of the force.

To prevent damage to the transmission, should such back fire occur, gear 40 is arranged to drive the crank shaft 10 through an overload clutch 41. This may be an ordinary friction clutch, so adjusted as to transmit torque reasonably in excess of that which motor 13 is capable of exerting through transmission 16 and well within the strength of the gearing which forms the transmission. However, if the torque for any reason rises to an amount exceeding this, such as would be apt to damage the gears, the clutch will slip. Thus, if during the operation of starting the engine, it happens to backfire so that the crank shaft turns in the opposite direction to that in which it was being cranked, the load imposed on the gearing by the starting motor attempting to drive the crank shaft in one direction and the engine back fire driving it in the other direction would be liable to wreck the transmission. Under such conditions, however, clutch 41 would merely slip, allowing the starting motor to continue to turn, while the crank turns in the reverse direction. No injury will result.

The construction of clutch 41 will now be described. This clutch is of the dry plate type wherein alternate plates are connected to the driving member and are urged into frictional engagement with plates disposed between them which are connected to the driven member. A resilient member is used to urge the plates into engagement, provision being made to adjust the force exerted by this member to allow the plates to slip when the power which the clutch is called upon to transmit exceeds a predetermined limit.

Gear 40 is shown as formed on a hub 75 which is suitably connected to a member 76, as by being formed integrally therewith. Member 76 forms a clutch housing, and includes a circular plate 77 serving as a cover for recesses 52 and 70 to maintain the parts in assembled relationship. The clutch housing 76 is rotatably supported on shaft 17 by means of an appropriate bearing bushing 78, interposed between the shaft 17 and the hub of gear 40. Housing member 76 has a cylindrical extension or flange 80, the interior surface of which has a plurality of keys or splines 81 formed therein. A plurality of spaced friction disks or plates 82 are provided with peripheral notches slidably to engage these keys, the plates having central bores 83 to clear shaft 17. Interposed between plates 82 are plates 84, the outside edges of which clear keys 81. The central bores 85 of plates 84, however, are arranged to engage splines 86 formed on shaft 17. Plates 82 are thus constrained to rotate with the housing 76, but are free with respect to the housing 76 but must rotate with shaft 17. By urging plates 82 and 84 into frictional engagement, rotative force may be transferred from the shaft to the housing or vice versa.

A large dished washer 87 of resilient material is confined between the outside clutch plate 88 and a collar 89 which is threadedly mounted on shaft 17, set screw 90 being provided to hold the collar in adjusted position. A fibre wear plate 91 is provided between the innermost clutch plate 82 and the back of housing 76. The arrangement is such that the spring washer 87 is effective to urge plates 82, 84 into frictional engagement, and by varying the position of collar 89 on shaft 17, the degree of such frictional engagement may be altered.

A second collar 95 is also threadedly mounted on shaft 17, set screw 96 serving to lock it against undesired movement. Collar 95 cooperates with a thrust washer 97 mounted in plate 30 to prevent axial movement of shaft 17 to the right (Fig. 1). A thrust washer 98 is interposed between the end of shaft 17 and a shoulder 99 formed on armature shaft 14 to prevent movement of shaft 17 to the left, it being understood that the bearing supporting shaft 14 at its left end (not shown) is capable of absorbing thrust at least toward the left.

The schematic showing of Fig. 6 is useful in visualizing the complete transmission. The full circles represent the pitch diameters of the various gears, marked with their appropriate reference characters, while the full lines represent the axes of the shafts and the real or virtual lever arms. The broken circle marked 105 indicates the position which may be assumed by idler 45 when disengaged from gear 40. The various arrows indicate the relative direction of rotation of the different gears, when these have the relative diameters shown. Obviously, a change in any or all of these diameters will not only alter the speeds at which the different gears rotate, but may also change the direction in which some of them revolve.

If desired, means for exerting a restraining force on each of the idlers, eccentrically with respect to its axis may be provided, to ensure that the idlers engage the driven gear. Thus in Figs. 2 and 3, a short pin 101 is shown as slidably supported in a hole 102, formed in member 50 and is urged outwardly against idler 45 by a spring 103. During rotation of the idler 45 in a clockwise direction as viewed in Fig. 2, the idler will be restrained somewhat by the pin 101, so that it more readily passes into engagement with gear 40. The pressure of the pin against the idler is light, so it has no effect on the subsequent rotation of the idler.

What is claimed is:

1. In a device of the character described, a driving shaft and a driven shaft, a gear on the driven shaft, a pinion, means adapted to form a one-way driving connection between the gear and pinion, and gearing means operatively connecting said pinion and said driving shaft, said gearing means including a driving gear on the driving shaft, a ring gear, and a planet gear member operatively connecting the ring gear and the driving gear and arranged to drive the pinion.

2. In a device of the character described, a driven gear, a pinion, means for rotatably supporting said pinion, said support means being revoluble about the axis of the gear, means for imparting a planetary motion to the pinion with respect to the gear, a floating pinion carried by said support means and maintained in mesh with the pinion, said floating pinion being adapted to engage said gear only when the peripheral speed of the first mentioned pinion exceeds that of the gear.

3. In a transmission mechanism adapted to releasably connect a pair of coaxial shafts, one of said shafts being the driving shaft, and the other of said shafts being the driven shaft, a pair of planetary gear trains, the planet gears of both trains being on a common shaft, means whereby rotation of the driving shaft imparts planetary motion to said planet gears, and means forming a releasible driving connection between the planet gear of one gear train and the driven shaft, whereby the planetary motion of said gear is effective to drive said shaft only while the speed imparted to the shaft by the gear exceeds the speed of the shaft.

4. In a starter mechanism for an internal combustion engine, a gear wheel connected to the engine, a driving gear wheel connected to a starting motor, a coupling gear adapted to be placed in operative relation between the other two wheels, and having an axis that is capable of movement with respect to the axes of said other two wheels for coupling and uncoupling said two wheels, guide means for restraining motion of the axis of the coupling gear in a planetary path about the axis of the driving gear, and means exerting a continuous, eccentric restraint on said pinion to cause the pinion to roll on said guide means into engagement with the gear wheel in response to rotation by the driving gear wheel.

5. In a device of the character described, a driven gear, a driving gear, means for rotatably supporting said driving gear, said support means being revoluble about the axis of the driven gear, means for imparting a planetary motion to the driving gear with respect to the driven gear, a floating pinion carried by said support means and maintained in mesh with the driving gear, and means carried by said support means exerting a continuous, eccentric force on said pinion to retard rotation of the pinion about its axis and to cause it to move into engagement with the driven gear upon rotation of the driving gear.

6. In a device of the character described, axially alined driving and driven shafts, a gear on the driven shaft, a pinion mounted eccentrically with respect to said shafts, means adapted to couple and uncouple said pinion and said gear, and means connecting said pinion with the driving shaft whereby the pinion is driven about said shafts is a planetary manner.

7. In a starter mechanism for an internal combustion engine, a gear wheel connected to the engine, a pinion means revoluble about the axis of the gear wheel for rotatably supporting the pinion, means operatively connecting said pinion to a starting motor for imparting a planetary motion to the pinion with respect to the gear, a floating pinion carried by said support means and maintained in mesh with the pinion, said floating pinion being urged away from said gear by the centrifugal force due to the rotation of the support means.

8. In a starter mechanism for an internal combustion engine, a driving pinion, a driven gear, means for imparting a planetary motion to the driving pinion about the axis of the driven gear, as well as a rotary motion about the axis of the driving gear, a floating idler pinion in engagement with the driving pinion, and means whereby said idler pinion is caused to engage the driven gear when the driving pinion is rotated, and to disengage the driven gear when the driven gear is moving at a higher peripheral speed than the driving gear.

GRANT GOULD SPEER, Jr.